(12) United States Patent
Harley et al.

(10) Patent No.: US 8,983,309 B2
(45) Date of Patent: Mar. 17, 2015

(54) CONSTRAINED CONTINUOUS PHASE MODULATION AND DEMODULATION IN AN OPTICAL COMMUNICATIONS SYSTEM

(75) Inventors: James Harley, Nepean (CA); Douglas McGhan, Ottawa (CA); Shahab Oveis Gharan, Ottawa (CA); Kim B. Roberts, Nepean, CA (US); Mark Rollins, Stittsville (CA)

(73) Assignee: Ciena Corporation, Hanover, MD (US)

( * ) Notice: Subject to any disclaimer, the term of this patent is extended or adjusted under 35 U.S.C. 154(b) by 334 days.

(21) Appl. No.: 13/371,846

(22) Filed: Feb. 13, 2012

(65) Prior Publication Data

US 2013/0209089 A1    Aug. 15, 2013

(51) Int. Cl.
*H04B 10/06* (2006.01)
*H04B 10/04* (2006.01)

(52) U.S. Cl.
USPC ........... 398/206; 398/205; 398/208; 398/202; 398/182

(58) Field of Classification Search
CPC ............ H04B 10/5561; H04B 10/548; H04B 10/532; H04B 10/516; H04B 10/6161; H04B 10/6165; H04B 10/6166; H04B 10/614
USPC ................................................. 398/182–214
See application file for complete search history.

(56) References Cited

U.S. PATENT DOCUMENTS

| | | | | |
|---|---|---|---|---|
| 5,642,384 | A * | 6/1997 | Ramesh | 375/265 |
| 6,587,521 | B1 * | 7/2003 | Matui | 375/341 |
| 7,236,701 | B2 * | 6/2007 | Yasue et al. | 398/76 |
| 7,471,904 | B2 * | 12/2008 | Kaneda et al. | 398/208 |
| 7,606,498 | B1 | 10/2009 | Wu et al. | |
| 7,636,525 | B1 * | 12/2009 | Bontu et al. | 398/208 |
| 7,684,712 | B1 * | 3/2010 | Roberts et al. | 398/208 |
| 7,769,305 | B1 * | 8/2010 | Roberts et al. | 398/206 |
| 7,894,728 | B1 | 2/2011 | Sun et al. | |
| 7,965,793 | B2 * | 6/2011 | Golitschek Edler Von Elbwart et al. | 375/308 |
| 8,005,368 | B2 * | 8/2011 | Roberts et al. | 398/150 |
| 8,135,283 | B2 * | 3/2012 | Sun et al. | 398/152 |
| 8,301,037 | B2 * | 10/2012 | Pfau | 398/205 |
| 8,315,528 | B2 * | 11/2012 | Roberts et al. | 398/208 |
| 8,498,544 | B2 * | 7/2013 | Duan et al. | 398/208 |
| 8,532,502 | B2 * | 9/2013 | Zhang et al. | 398/206 |
| 8,532,504 | B2 * | 9/2013 | Wagner et al. | 398/208 |
| 8,538,279 | B2 * | 9/2013 | Li et al. | 398/208 |
| 8,682,182 | B2 * | 3/2014 | Zhou et al. | 398/208 |
| 8,693,898 | B2 * | 4/2014 | Koizumi et al. | 398/208 |

(Continued)

*Primary Examiner* — Ken Vanderpuye
*Assistant Examiner* — Dibson Sanchez
(74) *Attorney, Agent, or Firm* — Kent Daniels; Daniels IP Services Ltd.

(57) ABSTRACT

A transmitter in an optical communications system includes a digital signal processor for processing a data signal to generate a sample stream encoding successive symbols in accordance with a constrained phase modulation scheme having a constellation of at least two symbols and a modulation phase constrained to a phase range spanning less than $4\pi$. A digital-to-analog converter converts the sample stream into a corresponding analog drive signal. A finite range phase modulator modulates a phase of a continuous wavelength channel light in accordance with the analog drive signal, to generate a modulated channel light for transmission through the optical communications system. A receiver in the optical communications system includes an optical stage for detecting phase and amplitude of the modulated channel light and for generating a corresponding sample stream, and a digital signal processor for processing the sample stream to estimate each successive symbol of the modulated channel light.

25 Claims, 7 Drawing Sheets

(56) References Cited

U.S. PATENT DOCUMENTS

| | | | |
|---|---|---|---|
| 8,855,501 B2* | 10/2014 | Xie | 398/202 |
| 2007/0092259 A1* | 4/2007 | Bontu et al. | 398/147 |
| 2008/0199191 A1* | 8/2008 | Essiambre et al. | 398/208 |
| 2009/0196602 A1* | 8/2009 | Saunders et al. | 398/26 |
| 2009/0201796 A1* | 8/2009 | Roberts et al. | 370/210 |
| 2010/0003028 A1* | 1/2010 | Zhang et al. | 398/65 |
| 2010/0329677 A1* | 12/2010 | Kaneda et al. | 398/65 |
| 2012/0033965 A1* | 2/2012 | Zhang et al. | 398/38 |
| 2012/0087679 A1* | 4/2012 | Goldfarb | 398/208 |
| 2012/0148266 A1* | 6/2012 | Komaki et al. | 398/210 |
| 2014/0050493 A1* | 2/2014 | Sigron et al. | 398/202 |

\* cited by examiner

CONSTRAINED CONTINUOUS PHASE MODULATION AND DEMODULATION IN AN OPTICAL COMMUNICATIONS SYSTEM

CROSS-REFERENCE TO RELATED APPLICATIONS

This is the first application filed in respect of the present invention.

TECHNICAL FIELD

The present application relates generally to optical communications systems, and more specifically to constrained continuous phase modulation and demodulation in an optical communications system.

BACKGROUND

For the purposes of understanding the present disclosure, it is useful to consider a representation of the total optical E-field E(t) as a vector confined to a plane and emanating from a fixed origin, where the length of the vector gives the amplitude of the E-field at any instant (t), and the direction of the vector gives the phase of the field at any instant (t). Within this construction, we consider two basis sets. The first basis set is a Cartesian coordinate system centered on the E-field origin. In this Cartesian representation, the total E-field E(t) is decomposed along the orthogonal Real (Re) and Imaginary (Im), or, equivalently, In-phase (I) and Quadrature (Q), directions. The second basis set is a polar coordinate system, again sharing its origin with that of the E-field vector. In this polar representation, the E-field is decomposed into vector length (S) and phase angle ($\phi$) relative to the Re-direction. These two basis sets are related by a non-linear transformation, in a manner well known in the art. In each of these representations, the time-sequence of loci of the end-point of the E-field vector may be referred to as a trajectory of the E-field.

The present disclosure discusses modulation formats and signals in which the state (e.g. amplitude and/or phase) of the signal at any instant depends on the state of the signal both before and after that instant. For example, the present disclosure discusses a Constrained Continuous Phase Modulation (C-CPM) scheme, in which the state of the modulated signal corresponding to a given symbol depends not only on the value of that symbol, but also on the values of the symbols that precede and follow it. Modulation formats and signals that display this characteristic may be referred to as having "memory".

In the optical communications space, various techniques are used to synthesize an optical communications signal for transmission. FIG. 1 illustrates a dual-polarization transmitter known in the art, which is designed to transmit two data signals on respective orthogonal polarizations of an optical wavelength channel. The laser 2 generates a narrow-band continuous wave (CW) optical carrier 4 having a desired wavelength. A beam splitter (or power divider) 6 separates the carrier 4 into a pair of linearly polarized CW lights, which are supplied to a respective E/O converter 8 which operates to modulate the amplitude and/or phase of the CW light to generate a respective polarization signal 10 based on one or more drive signals S(t) generated by a driver circuit 12 based on a respective input data signal x(t) and y(t). The two polarizations signals are then combined using a polarization combiner 14 to yield a polarization multiplexed optical communications signal 16 for transmission to a receiver.

In the arrangement illustrated in FIG. 1, each E/O converter 8 is provided a nested Mach-Zehnder (MZ) modulator known in the art. This arrangement enables the transmitter to utilize a variety of modulation and encoding schemes, to obtain high spectral efficiency and data transmission speeds. For example, transmitters using optical coherent modulation formats such as dual polarization multiplexed Quadrature Phase Shift Keying (DP-QPSK) and a nested Mach Zehnder E/O modulators constructed using Lithium Niobate (or Indium Phosphide) have recently enabled transmission rates exceeding 40 Gbps (Giga-bits-per-second) per optical wavelength channel over geographical distances of several hundred kilometers. A limitation of these transmitters, however, is that the optical components, particularly the E/O converter 8, are expensive.

Techniques that enable high speed communications with low-cost optical components remain highly desirable.

SUMMARY

An aspect of the present invention provides a transmitter for use in an optical communications system, the transmitter includes: a digital signal processor for processing a data signal to generate a multi-bit digital sample stream encoding successive symbols in accordance with a constrained phase modulation scheme having an asymmetrical constellation of at least two symbols and in which a modulation phase is constrained to a phase range spanning less than $4\pi$. A digital-to-analog converter for converting the multi-bit digital signal into a corresponding analog drive signal. A finite range phase modulator for modulating a phase of a continuous wavelength channel light in accordance with the analog drive signal, to generate a modulated channel light for transmission through the optical communications system. A corresponding receiver includes an optical stage for detecting phase and amplitude of a modulated channel light received through the optical communications system and generating a corresponding multi-bit digital sample stream, and a digital signal processor for processing the multi-bit digital signal to recover an estimate of each successive symbol of the modulated channel light.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

In very general terms, the present disclosure provides an optical communications system in which encoded symbols are modulated onto the optical carrier 6 using a constrained—continuous phase modulation (C-CPM) scheme.

Continuous Phase Modulation (CPM) is known in the field of wireless communications systems. It is well known that the phase evolution in CPM is not bounded. The phase modulation process is modelled as a tree whose outer envelope extends towards infinity over time [See Digital Communications, fourth Edition, John G. Proakis, page 189-190]

Figure 1:
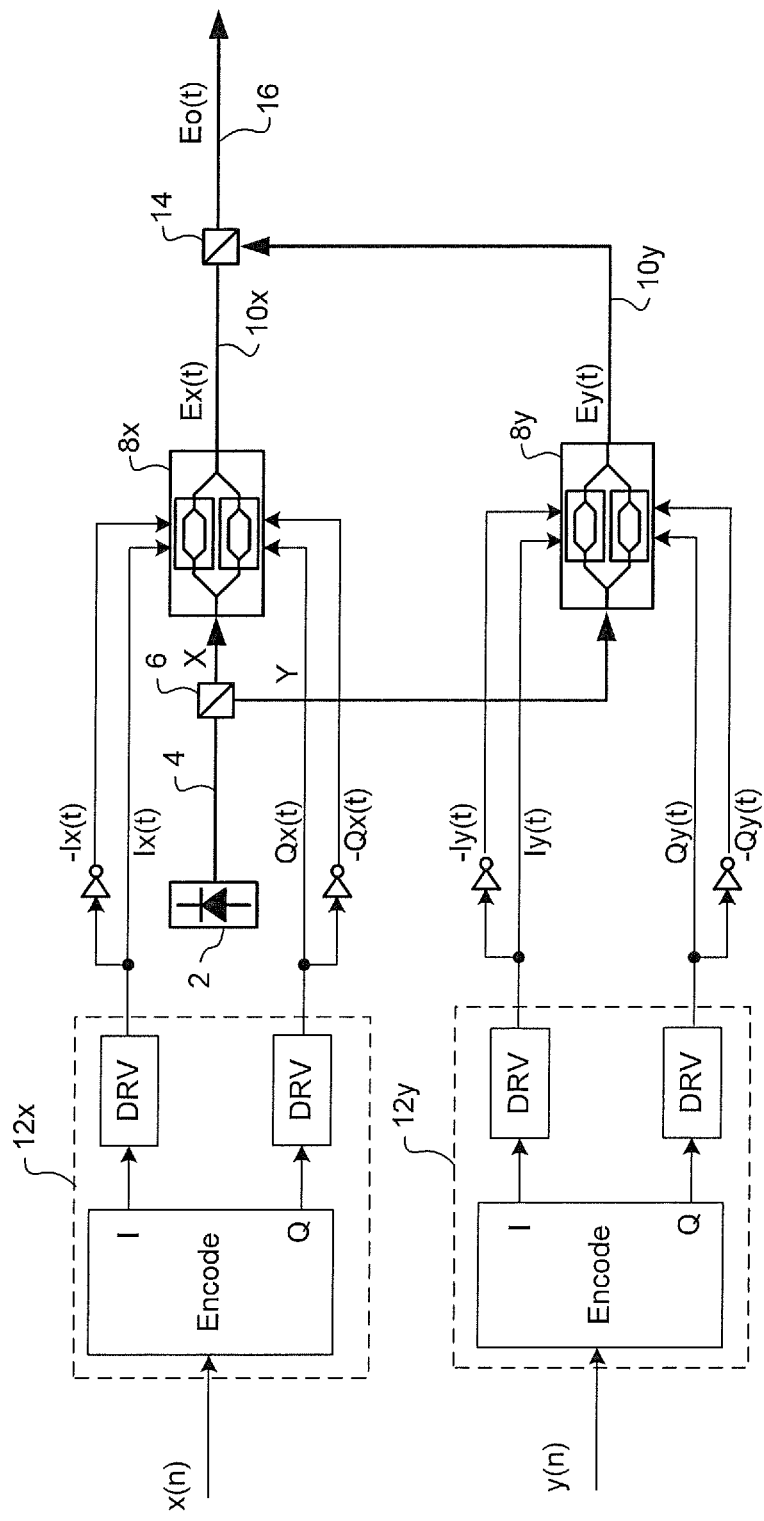
FIG. 1 schematically illustrates principal elements and operations of an optical transmitter known in the art.
Figure 2:
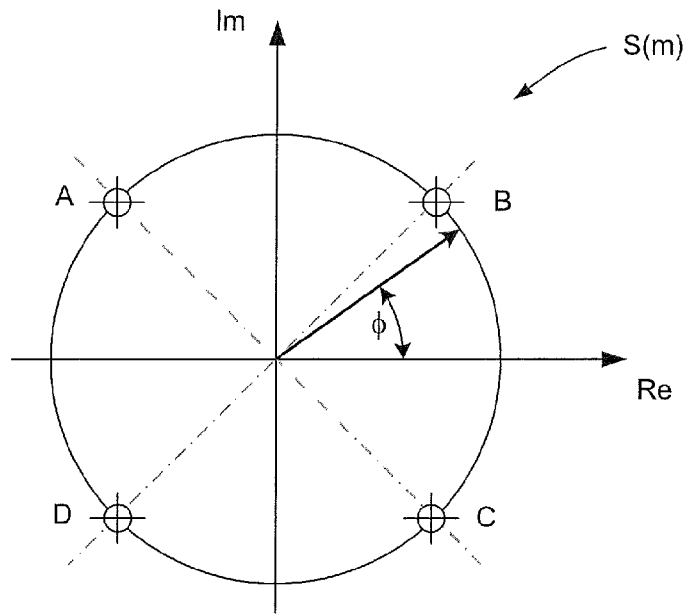
FIG. 2 illustrates a known quadrature phase modulation scheme in the Re/Im plane.

FIG. 2 illustrates a known quadrature phase modulation scheme, such as Quadrature Phase Shift Keying (QPSK), in the Re/Im plane. The illustrated modulation scheme comprises constellation of four phase states (A-D) symmetrically arranged about the origin, each of which corresponds with a symbol that encodes two bits of data. The optical signal modulation may conveniently be represented as a vector having a constant magnitude and a time-varying phase $\phi$, which transitions between the various phase states in accordance with the modulated data. As is known in the art, the modulation phase $\phi$ can increase over time without bound, because any multiples of $4\pi$ implicit in the modulation phase $\phi$ will not affect detection at the receiver. As such, known quadrature phase modulation schemes also examples of unconstrained phase modulation, because there is no constraint on the maximum value of the modulation phase $\phi$.

Figure 3:
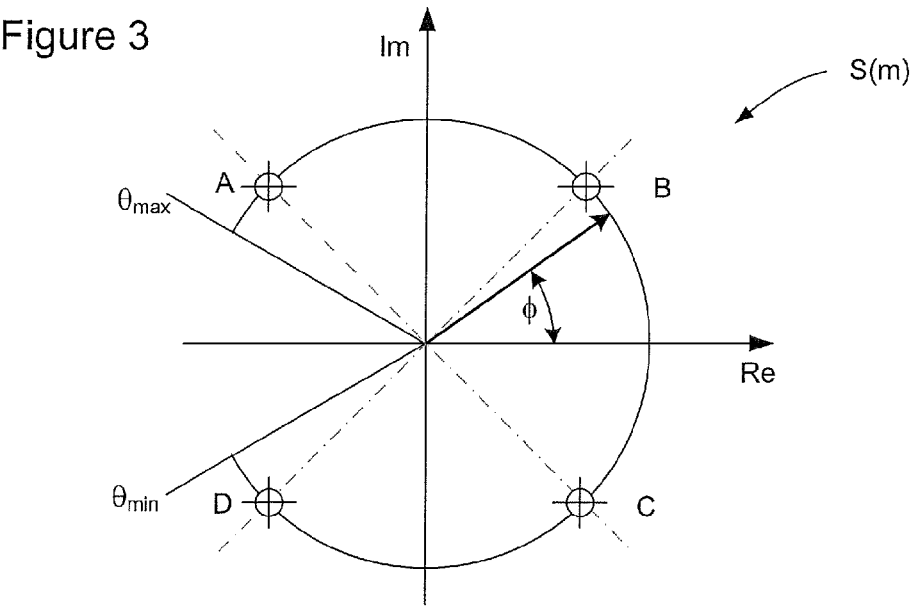
FIG. 3 illustrates a representative constrained continuous phase modulation scheme in accordance with an aspect of the present invention, in the Re/Im plane.

For the purposes of the present disclosure, constrained—continuous phase modulation (C-CPM) shall be understood to refer to a modulation scheme in which the phase of a continuous wave (CW) carrier can be modulated within a continuous phase range between predefined limits. FIG. 3 illustrates a possible C-CPM, in the Re/Im plane. As in FIG. 2, the illustrated C-CPM scheme comprises constellation of four phase states (A-D) symmetrically arranged about the origin, each of which may correspond with a symbol that encodes two bits of data. The optical signal modulation may also be represented as a vector having a constant magnitude and a time-varying phase $\phi$, which transitions between the various phase states in accordance with the modulated data. However, unlike conventional quadrature phase shift keying, the modulation phase $\phi$ is constrained to a phase range $\theta_{min}$ to $\theta_{max}$ spanning less than $4\pi$.

In the embodiment of FIG. 3, a direct consequence of this arrangement is that a direct (shortest path) transition between phase states A and D (or, equivalently, the corresponding symbols) is not possible. Rather, a phase transition between the phase states (symbols) A and D requires "going the long way around", via phase states B and C. In any physical phase modulator having a non-zero capacitance, this implies that the time, or power (or both), required to transition between any two states will depend on the phase separation between the involved states. Thus, for example, transitions between phase states (symbols) A and D will take more time, or consume more power (or both) than transitions between phase states A and C and B and D, both of which will take more time and/or consume more power than transitions between phase states A and B; B and C; or C and D.

Figure 4A:
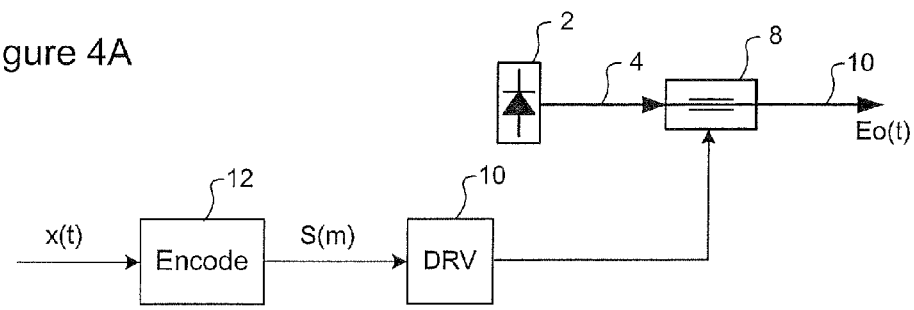
FIGS. 4A-4C schematically illustrate principal elements and operations of constrained continuous phase modulation optical transmitters in accordance with aspects of the present invention.
Figure 4B:
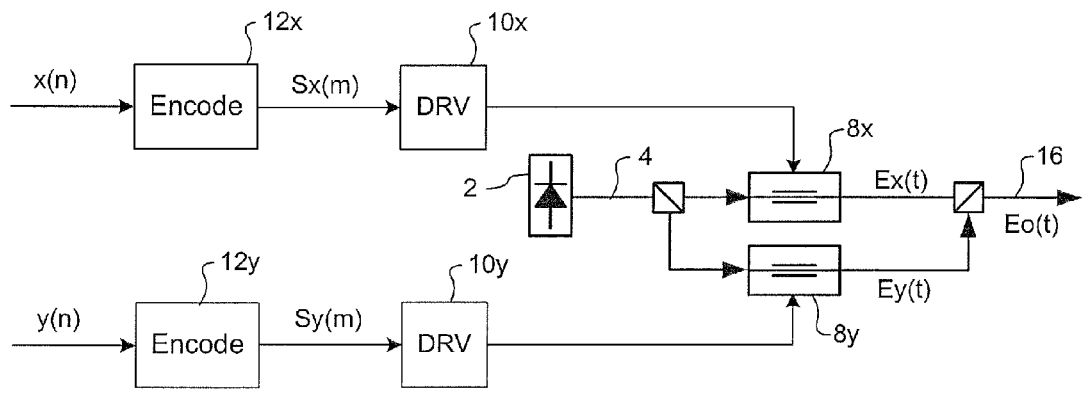

FIGS. 4A and 4B illustrate representative transmitters that may be used to generate a C-CPM optical signal. The transmitter of FIG. 4A is configured to encode and modulate an input signal x(t) onto the optical carrier 4 to generate a phase-modulated output signal Eo(t) 10 in the form or either a linearly of circularly polarized signal. FIG. 4B illustrates an alternative embodiment, in which respective input signals x(t) and y(t) are encoded and modulated onto respective orthogonal polarizations of the optical carrier 4. The phase modulated polarizations are then combined to generate the output signal Eo(t) 16 in the form of a dual polarization multiplexed optical signal. In both of the embodiments of FIGS. 4A and 4B, the E/O converters 8 are provided as voltage-driven optical phase modulators, which impose a phase shift on the respective carrier light in accordance with the applied drive voltage.

Voltage-driven phase modulators suitable for use in the transmitters of FIGS. 4A and 4B are well known and readily available commercially at comparatively low cost. For the purposes of the present application, two characteristics of such a phase modulator are important, namely: the phase can only be modulated within a finite phase range (that is, the phase range is "constrained") which is limited by the finite voltage swing of the drive signal S(t); and, within this finite phase range, the phase modulation is continuous (in that it is not limited to a set of discrete phase values) and band limited.

The feature of continuous modulation is a product of the analog voltage response of the phase shifter, in that the imposed phase shift is proportional to the applied drive voltage, which can take any analog value within the capabilities of the drive circuitry. The feature of band limited is a function of the physical design of the phase modulator (for example, its capacitance), in that a non-zero amount of time is required to transition between any two discrete phase values, and the amount of transition time will tend to increase with increasing "distance" between the two phase states.

Taken together, the above-described characteristics mean that constrained-phase modulation is a non-linear modulation format in the sense that a given symbol modulated onto the carrier light cannot be decomposed to a single pulse shape amplitude modulated by data. By way of comparison, conventional optical modulation formats (such as, for example, OOK, QPSK etc.) are linear modulation formats in which each symbol of the constellation is decomposable into a single pulse shape (that is common to all symbols) with a respective amplitude modulation (either of optical intensity or phase) that represents the value of the symbol, and this fact can be exploited to derive an optimum demodulation method for use in the receiver to detect and recover the transmitted data.

Figure 4C:
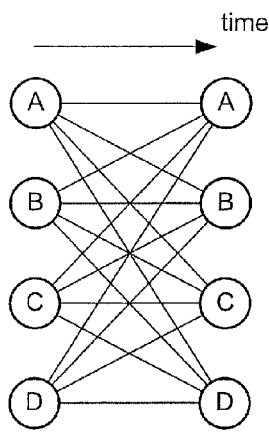

Constrained phase modulation may be conceptualized as a phase trellis with a limited phase extent. The phase trellis can then later be exploited in the demodulation design. It may be noted that, in conventional continuous phase modulation (CPM) techniques, such as is known in Radio Frequency (RF) technology, the phase is unconstrained, and so can increase to infinity. In such a case, the phase trellis is represented as a tree which over time extends towards infinite phase extent. In direct contrast, in constrained phase modulation, the phase trellis is limited to a set of N nodes (or phase states). In some embodiments, $N=2^m$, where m is the number of bits encoded into each symbol. There then exists a unique mapping from one instance of the phase trellis to the next. FIG. 4C illustrates a representative mapping between two instances of a four-node trellis, which is applicable to the constellation of FIG. 3. In the example of FIG. 4C, each phase node can be mapped to all of the N nodes in the next instance. As may be seen in FIG. 4C, this implies that a phase node can be mapped to itself.

Again this is another feature not entertained in the continuous phase modulation (CPM) literature, as this mapping arises out of the limited phase excursion constraint.

The phase trellis can then be mapped to a modulation method in the following way. A mapping from a phase node in a first instance of the trellis to a phase node in a second instance of the trellis is implemented by a phase waveform which starts and ends at the two sets of phase nodes. For the example of four phase nodes with the mapping described, there are therefore 16 unique phase waveforms between any two instances of the trellis. The phase waveform output by the encoder thus depends on the previous phase node and the new phase in the next instance of the trellis. In this way, the encoder adds memory to the modulation as well as ensuring that the modulation is phase continuous. In some embodiments, an encoded symbol may be represented by the combination of the previous phase node and the current phase waveform, or equivalently, the previous node and the new phase node.

As may be appreciated, there are many choices available for the phase waveform which traverses between the phase points. One choice is a phase waveform that changes linearly in time between the two phase points.

Those skilled in the art will be readily able to design various mappings between data bits (or encoded symbols) and phase nodes or waveforms. Accordingly, a detailed discussion of such mappings is not provided here.

Note that the transmitted pass band E-Field signal is in the Cartesian space, where the complex envelope is given by $\cos(\phi t)) + j \sin(\phi(t))$. In this Cartesian space, the 16 unique phase waveforms are mapped to sixteen unique complex Cartesian signals.

As may be appreciated, a constrained phase modulation scheme may be implemented by a driver 10 composed of any suitable combination of hardware and/or software. In some embodiments, the driver 10 may be constructed using a Digital Signal Processor (DSP) Application Specific Integrated Circuit (ASIC) with a high speed Digital-to-Analog Converter (DAC) that supplies the drive signal S(t) via an RF gain stage to an RF electrode of the optical phase modulator. It can be readily shown that a DSP ASIC with DAC can drive the required range of phase waveforms.

Figure 5A:
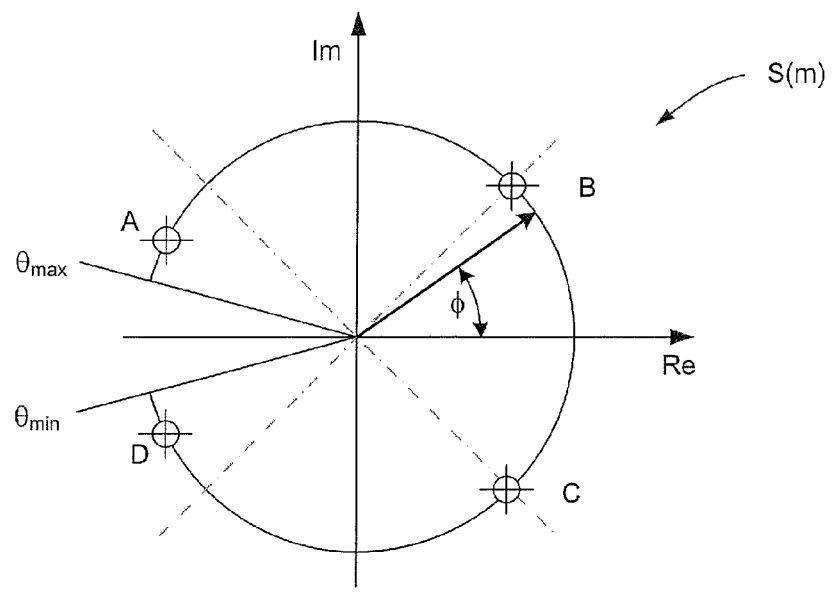
FIGS. 5A and 5B illustrate respective asymmetrical constellations usable in the transmitters of FIGS. 4A and 4B.
Figure 5B:
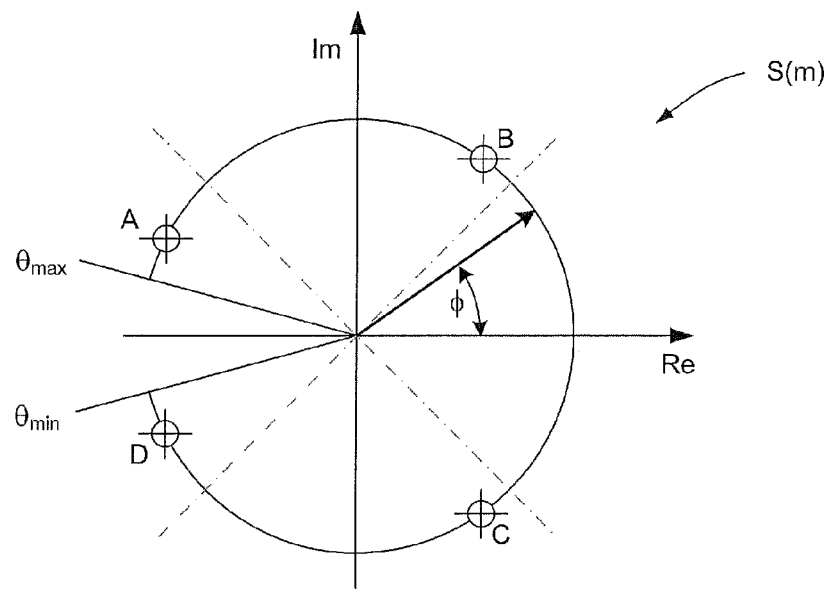

In the embodiment of FIG. 3, the constellation of phase states is symmetrically arranged in the Re/Im plane. However, the inventors of the present application have discovered that improved demodulation performance can be obtained by the use of an asymmetrical constellation. FIG. 5A illustrates one possible constellation, in which states A and D have been rotated to increase the phase distance to states B and C, respectively, and thereby provide asymmetry about the Im axis. FIG. 5B illustrates another possible constellation, in which all four states have been rotated in such a manner as to provide asymmetry about the Im axis, while also ensuring that the phase distance between any two adjacent states is approximately equal.

In all of the constellations illustrated in FIGS. 3 and 5A-B, the upper and lower limits of the phase modulation range, $\theta_{min}$ and $\theta_{max}$, do not correspond with symbols. This is for simplicity of illustration only. In fact, the upper and lower bounds $\theta_{min}$ and $\theta_{max}$ may correspond with encoded symbols, if desired. The constellations illustrated in FIGS. 5A-B extend beyond 270°, which has been found to offer advantageous performance, but is not essential. In fact, the upper and lower bounds $\theta_{min}$ and $\theta_{max}$ of the phase modulation range will normally be determined by the capabilities of the drive circuit and the chosen phase shifter, and the symbol constellation may utilize all or part of the phase range, as desired.

All of the constellations illustrated in FIGS. 3 and 5A-B comprise four symbols. However, this is not essential. More generally, a constellation of at least two symbols can be used.

As is known in the art, some commercially available phase shifters exhibit a non-linear phase response. If desired, this phase response may be compensated by predistorting the drive signals in a manner known in the art.

Figure 6:
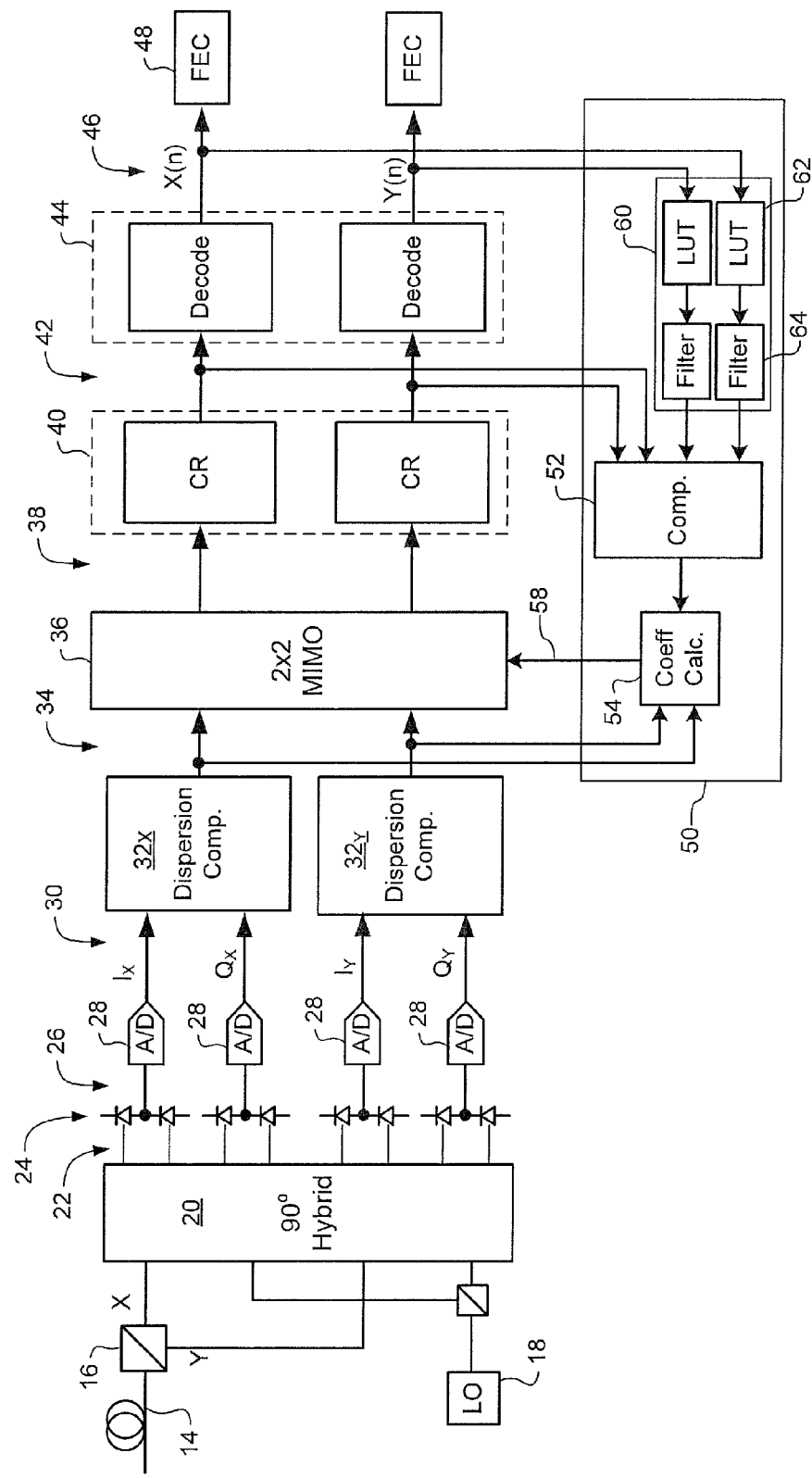
FIG. 6 is a block diagram schematically illustrating elements of a coherent optical receiver in accordance with aspects of the present invention.

FIG. 6 illustrates principle elements of a receiver which may be used to receive and decode a constrained phase modulated signal of the type generated by the transmitter of FIG. 4B. As may be seen in FIG. 6, an inbound dual-polarization multiplexed optical signal is received through an optical link 14, split into orthogonal received polarizations by a Polarization Beam Splitter 16, and then mixed with light from a Local Oscillator (LO) 18 by a conventional 90° optical hybrid 20. The composite optical signals 22 emerging from the optical hybrid 20 are supplied to respective photodetectors 24, which generate corresponding analog electrical signals 26. The photodetector signals 26 are sampled by respective Analog-to-Digital (A/D) converters 28 to yield raw multi-bit digital signals 30 corresponding to In-phase (I) and Quadrature (Q) components of each of the received polarizations.

The resolution of the A/D converters 28 is a balance between performance and cost. It has been found that a resolution of n=5 or 6 bits provides satisfactory performance, at an acceptable cost. In some embodiments, the sample rate of the A/D converters 28 may be selected to satisfy the Nyquist criterion for the highest anticipated symbol rate of the received optical signal. However, this is not essential.

From the A/D converters 28, the respective n-bit I and Q signals 30 of each received polarization are supplied to a respective dispersion compensator 32, which operates on the raw digital signal(s) 30 to at least partially compensate chromatic dispersion of the received optical signal. If desired, the dispersion compensators 32 may be configured to operate as described in Applicant's U.S. Pat. No. 7,894,728, which issued Feb. 22, 2011.

The complex valued dispersion-compensated digital signals 34 appearing at the output of the dispersion compensators 32 are then supplied to a polarization compensator 36 which operates to compensate polarization impairments in the received optical signal, and thereby produce respective complex valued sample streams 38 corresponding to each transmitted polarization. These sample streams 38 contain both amplitude and phase information of each transmitted polarization, and include phase error due to the frequency offset between the Tx and LO frequencies, laser line width and phase noise. The sample streams 38 appearing at the output of the polarization compensator 36 are then supplied to a carrier recovery block 40 for detection and correction of phase errors. The phase corrected sample streams 42 output from the carrier recovery block 40 are then passed to a decoder block 44 which generates estimates of the symbols modulated on each transmitted polarization. These symbol estimates 46 are then passed to a Forward Error Correction block 48 for data recovery.

A specific challenge in designing the polarization compensator 36 is to equalize the optical channel when the modulation format is nonlinear and has memory, as is the case with C-CPM signals. One approach, which is known from unconstrained CPM in the wireless context, is to linearize the equalization by exploiting the fact that a CPM signal can be represented as a parallel set of N unique waveforms (each of which each is linearly modulated by a nonlinear alphabet). In this case, the equalization approach is to build N parallel full through-put equalizers, each of which processes one of the N waveforms. However, in the high speed optical coherent receiver of FIG. 6, this approach effectively increases the hardware complexity (by a factor of N) as compared to an equalizer designed for a linear modulation scheme. This additional complexity is cost-prohibitive.

In the illustrated embodiments, this problem is overcome by the use of a single equalizer implemented as a 2×2 Multiple-In-Multiple-Out (MIMO) channel equalizer, which uses the sequence of symbols modulated on each polarization as the target. As is known in the art, in a conventional operation of an 2×2 MIMO equalizer, equalization coefficients are calculated using a cost function which operates on the input to the 2×2 MIMO equalizer and an error signal derived from a predetermined target sequence. In some cases, this target sequence may correspond with a known symbol sequence inserted into an overhead of each transmitted polarization. The illustrated embodiment differs from this conventional technique in that the target is not a predetermined symbol sequence stored in a memory, for example, but rather is derived from the actual symbols modulated on each polarization. There are number of different cost functions that may be used, including zero forcing and various methods of Minimum Mean Square like Recursive Least Square or Least Mean Square. A preferred cost function is the Least Mean Square in terms of sufficient dynamic performance for minimum hardware. Note that since the target is the modulated sequence waveforms in each polarization, the MIMO Equalizer needs to operate on a block by block basis which contains sufficient portion of a sequence. In the illustrated embodiment the 2×2 MIMO channel equalizer is steered to a Minimum Mean Square Error (MMSE) solution by a respective set of coefficients computed by a feedback loop 50 comprising a comparator 52 and a coefficient calculator 54. In general, the comparator 52 operates to compute an error signal between the signals 42 supplied to the data decoder 44, and the symbol estimates 46 generated by the data decoders 44. The coefficient calculator 54 then uses the complex valued dispersion-compensated digital signals 34 and the error signal to compute a set of coefficients 58 that, when uploaded to the polarization compensator 36, minimizes the error computed by the comparator 52.

The use of a 2×2 MIMO channel equalizer is 1/N less hardware complex than conventional methods. In some embodiments, the 2×2 equalizer may be provided as a block frequency domain equalizer, but a time domain equalizer is also possible. In some embodiments, the feedback loop 50 implements a Least Mean Squares (LMS) algorithm, for hardware efficiency. However, other methods may be used if desired, such as recursive least square or block matrix calculation of the MMSE filter.

The use of a sequence based 2×2 MIMO channel equalizer can cause two problems. The first problem is that the MIMO can color the noise which can degrade the performance of nonlinear sequence detectors in the data decoders 44. The second problem is that the MIMO channel equalizer can add some additional memory into the nonlinear signal which further complicates and or degrades the sequence detectors.

In the illustrated embodiment, these problems are overcome by the use of a programmable target filter 60, which filters the symbol estimates 46 in order to enable shaping the MIMO equalizer 36 in terms of whitening the noise and minimizing any additional memory being added to the signal.

In the illustrated embodiment, the symbol estimates 46 are used to address a look-up table (LUT) 62, which outputs a sample stream that emulates the complex valued dispersion-compensated digital signals 34 input to the 2×2 MIMO. As such, the output of the LUT 62 is a reconstruction of the single input to the 2×2 MIMO. These sample streams are then supplied to a filter 64. The preferred frequency response for this filter 64 is to provide additional gain for the high frequency content of the filter function that the feedback loop 50 converges to. This high frequency gain or 'peaking' helps to whiten the noise (e.g. makes the statistics of the noise independent from sample to sample) which yields a performance gain to the decoder block 44.

As noted above, FIGS. 4A and 4B illustrate respective asymmetrical constellations that may be used in a C-CPM modulation scheme. One characteristic of these modulation schemes is that they have a non-zero mean. Other modulation schemes can also produce a signal with a non-zero mean. One issue with a non zero mean is that is can prevent convergence of convergence of the LMS algorithm to an MMSE solution. In particular, if the LMS error term generated by the comparator 52 has a non zero mean which then is multiplied with the input signal that has a non zero mean, then the product of these two non zero mean terms can prevent convergence of the LMS algorithm.

This problem may be overcome by removing the non-zero mean of either the LMS error signal or the dispersion compensated signals 34 supplied to the MIMO channel equalizer 36. With this arrangement, if either teen in the product is zero, the bias from the non zero mean is removed.

There many techniques known in the art that may be used to remove the mean from either the LMS error signal or the dispersion compensated signals 34. For example, a filter may be used to notch out the non zero mean content. In the case of the dispersion compensated signals 34, such a filter may be implemented as part of either the dispersion compensators 32 or at the input of the 2×2 MIMO channel equalizer 36. In the case of the LMS error signal, the filter ma be implemented as part of the coefficient calculator 54.

Co-assigned U.S. Pat. No. 7,606,498, which issued Oct. 20, 2009, describes techniques for carrier recovery in a coherent optical receiver. In these techniques, a phase error $\Delta\phi$ is computed for each symbol estimate, and accumulated to over time to obtain a total phase rotation that is applied to each successive symbol estimate to compensate phase error due to the frequency offset between the Tx and LO frequencies, laser line width and phase noise. For linear modulation schemes (such as QPSK), these techniques are found to be very useful. However, in the case of constrained continuous phase modulation, the per-symbol phase error computation is prone to unacceptably high error. The challenge here is to track signal phase from large linewidth laser and/or cross phase modulation from co-propagating Intensity modulated signal while the signal of interest itself is non-linear and has memory.

Figure 7:
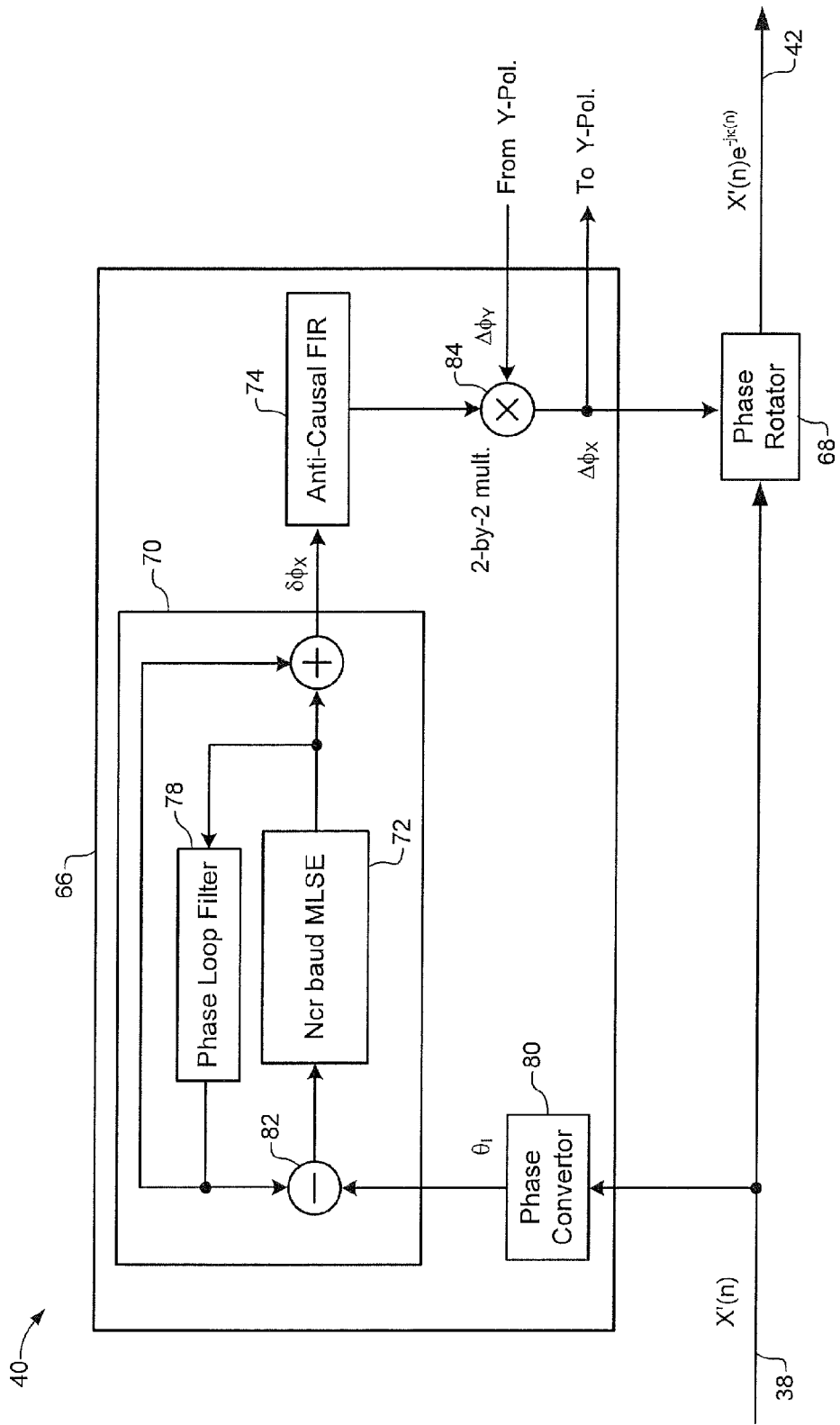
FIG. 7 is a block diagram schematically illustrating elements and operations of a carrier recovery block usable in the receiver of FIG. 6.

In order to address this challenge, the carrier recovery block 40 may implement a sliding window Maximum Likelihood Sequence Estimator (MLSE) with a window-length corresponding to Ncr symbols, for determining a phase reference that may be used to estimate the phase error of each symbol. FIG. 7 illustrates a representative carrier recovery block 40 for the complex-valued X-polarization sample stream X'(n). It will be recognised that the Y-polarization recovery block will be substantially identical.

In the embodiment of FIG. 7, the carrier recovery block 40 includes a phase detector 66 which processes complex-valued samples X'(n) received from the polarization compensator 36 to calculate a maximum likelihood phase error $\Delta\phi_X$, and a phase rotator 68 which operates to rotate the phase of the received samples X'(n) to generate corresponding rotated samples $X'(n)e^{-jK(n)}$. In general terms, the phase detector 66 includes a phase feedback loop 70 based on am Ncr baud sliding window Maximum Likelihood Sequence Estimate (MLSE) phase detector 72, followed by an anti-causal phase Finite Impulse Response (FIR) filter 74. The (MLSE) phase detector 72 computes a phase error estimate $\delta\phi_X$, and the anti-causal FIR filter 74 filters the phase error estimate $\delta\phi_X$ obtain the maximum likelihood phase error $\Delta\phi_X$.

A standard MLSE detector with Viterbi decoding, which uses a long trace back to decode a sequence, is too slow to be usable in the phase feedback loop 70, because the time delay in the Viterbi decoder slows the tracking speed and so inhibits the ability of the phase feedback loop 70 to compensate phase transients due to laser line width, for example. The illustrated sliding window MLSE detector 72, on the other hand, determines the most likely data symbol sequence in an Ncr baud window (encompassing Ncr+1 samples), with minimal processing delay. In a preferred implementation, a pair of Viterbi algorithms are used in parallel, namely: a forwards Viterbi algorithm which computes a most likely sequence starting at one end of the window; and a backwards Viterbi algorithm which computes a most likely sequence starting at the opposite end of the window. Each Viterbi algorithm processes approximately half of the window, with an overlap region in the middle of the window spanning one baud in the case of Ncr odd, or two baud in the case of Ncr even. This arrangement approximately halves the processing time since the forwards and backwards Viterbi algorithms can operate simultaneously.

Figure 8:
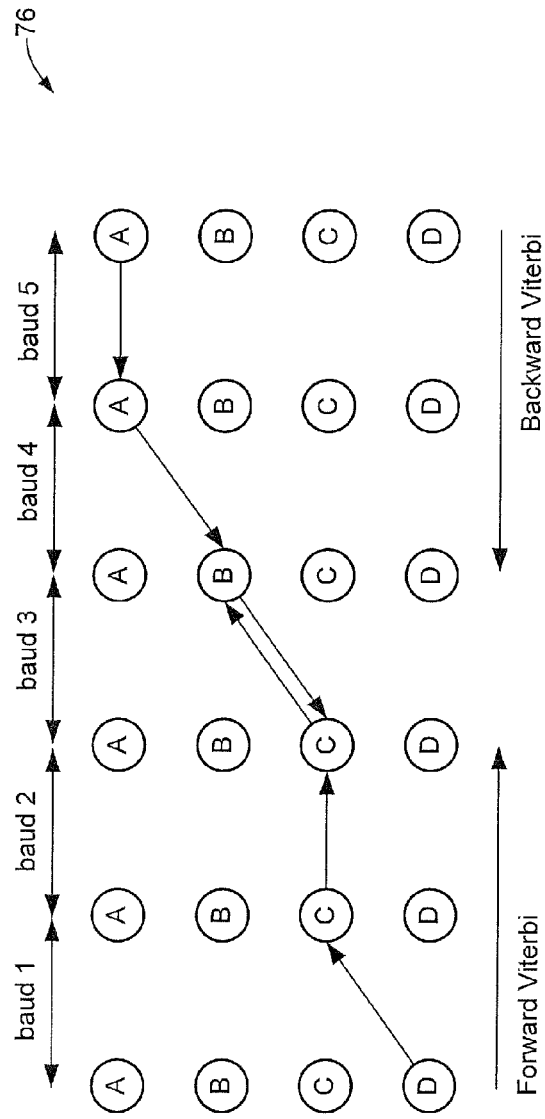
FIG. 8 schematically illustrates a representative window usable in the carrier recovery block of FIG. 7.

FIG. 8 illustrates a representative window 76 spanning Ncr=5 baud and a symbol constellation of 4 symbols. In this case, each of the forwards and backwards Viterbi algorithms processes three baud, overlapping at baud 3. For this 5-baud window 76, there are $4^6$=4096 possible sequences. At each baud, a Viterbi algorithm determines the 4×4=16 branch metrics and then each node selects the path with the minimum Euclidean distance. Hence after the branch metric calculations there are only 4 paths that remain of interest for each Viterbi algorithm. This means that each Viterbi algorithm will calculate a respective set of four paths (sequences), which will overlap at baud 3. Within this overlap region, there are 16 possible "links" between the four paths computed by the forwards Viterbi algorithm and the four paths computed by the backwards Viterbi algorithm. To determine the most likely sequence as measured from the middle of the window (baud 3 in FIG. 8), these 16 possible links are examined, and the path with the minimum Euclidean distance is selected.

Once the most likely data symbol sequence has been determined, the phase difference $\phi 1$ between the most likely data symbol sequence and the received samples $X'(n)$ can be readily determined. In some embodiments, the phase difference $\phi 1$ can be used as the phase error estimate $\delta\phi_X$, and supplied to the anti-causal FIR 74. However, improved performance can be obtained by determining a second phase difference $\phi 2$, between the second most likely data symbol sequence and the received samples $X'(n)$, and then calculate the phase error estimate $\delta\phi_X$ as an approximate Minimum Mean Square Estimate (MMSE) by using a weighted average of $\phi 1$ and $\phi 2$. The second most likely data symbol sequence can be determined by again examining the 16 possible links in the middle of the window and selecting the path with the second smallest Euclidean distance. For convenience, the Euclidean distance of the most likely data symbol sequence may be referred to as E1, and the Euclidean distance of the second most likely data symbol sequence may be referred to as E2. One way to implement this weighted average is to use an equation of the form:

$$\delta\phi_X = \phi 1 + \text{scale(diff)} * \frac{(\phi 2 - \phi 1)}{2^N}$$

Where diff is proportional to (E2−E1), and may be used as an index into a look up table that outputs the value "scale". In this case, the Sliding window MLSE phase detector 72 computes the values of $\phi 1$, $\phi 2$, E1 and E2, and a Phase loop filter block 78 implements the function $$\text{scale(diff)} * \frac{(\phi 2 - \phi 1)}{2^N}.$$

The embodiment illustrated in FIG. 7 also exploits the phase trellis structure of the C-CPM modulation format to achieve a further reduction in hardware size, and processing delay in the Viterbi decoding operation. A measure of the size of the hardware is the number of multiplications required per baud. For a dual polarization optical signal and an Ncr baud window, one would need $2\times2\times(4^{Ncr})$ multiplications to compute the $2\times(4^{Ncr})$ Euclidean distances for the $2\times(4^{Ncr})$ possible data sequences. Using the forwards and backwards Viterbi decoder described above, only 2×2×(16)=64 multiplications are required, even with an Ncr=5 baud window. However, it would be preferable not use any multiplications in the Euclidean distance calculations, since multiplications add to the loop delay and hence reduce the bandwidth of the phase feedback loop.

The main function of the phase loop filter 78 is to center the MLSE phase detector 72 in order to optimize the phase error estimate $\delta\phi_X$. If this phase reference is beyond the phase observation range of the MLSE phase detector 72, then there will be corresponding degradation in the phase estimate from the MLSE phase detector. Given the bandwidth of the phase impairments of laser linewidth and XPM, fast tracking by the phase feedback loop 70 is required.

Accordingly, Euclidean distances may be computed in the phase domain only. With this arrangement, the Euclidean distance is computed between two vectors, where the amplitude of each vector is assumed to be the same. Under this assumption, the Euclidean distance is proportional to 1−cos ($\phi$) where $\phi$ is the difference in phases between the two vectors. Thus, for example, the Euclidean distances E1 and E2 are proportional to 1−cos($\phi 1$) and 1−cos($\phi 2$), respectively. The function 1−cos($\phi$) can easily be implemented with a look up table. Also because of the symmetries in this function, it is possible to reduce $\phi$ to a small unsigned integer which may be used as an index into this table. Hence this table can be quite small. This method of computing Euclidean distance is dramatically smaller and faster than the 64 high resolution multiplications required by the method described above. An additional advantage of working in just the phase domain is that the rotation of the received data samples $X'(n)$ is a simple subtraction of the phase estimate from the phase feedback loop. In the Cartesian domain, this rotation would require a high resolution complex multiplication which again would add time and size.

In the embodiment of FIG. 7, a phase detector 80 (such as, for example, a CORDIC converter) is used to obtain the respective phase $\phi$ of the Cartesian received data samples $X'(n)$. This phase value $\theta$ is then subtracted (at 82) from the output of the Phase loop filter 78, to obtain corresponding rotations that are supplied to the sliding window MLSE phase detector 72, so that the phase feedback loop 70 can be implemented entirely in the phase domain. For the C-CPM modulation format, where the transmitted signal has close to a constant amplitude, implementation of the MLSE phase detector 72 in the just phase domain causes only a very small reduction in accuracy of the phase error estimate $\delta\phi_X$.

The second stage of this carrier recovery is to extract the phase error estimate $\delta\phi_X$ from the phase feedback loop 70 and then filter this unfiltered phase estimate $\delta\phi_X$ with an anti causal FIR 74. Anti causal phase filtering has the benefit of using information from the past (causal) and the future (anti causal) to estimate present phase value. Typically the improvement in phase estimate with anti causal filtering is 3 dB. Note the phase feedback loop is just a causal filter.

There are many options for structuring the anti-causal FIR 74. The key requirement is that the maximum likelihood phase error $\Delta\phi_X$ estimate is obtained from filtering both the past and future unfiltered phase estimates $\delta\phi_X$. One hardware efficient approach which eliminates multiplications is to set all of the FIR coefficients to one. In this case, only one multiplication is needed. It is known that there can be different amounts of correlation between XPM between the X polarization and Y polarization. This correlation can be exploited in the Carrier Recovery by linearly combining the estimates from X and Y polarization. One method to do this combining is to add a low resolution 2×2 multiply 84 at the output of the anti-causal FIR 74.

Figure 9:
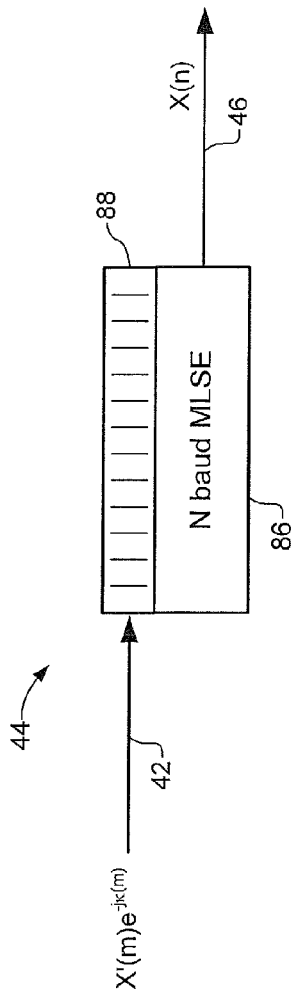
FIG. 9 is a block diagram schematically illustrating elements and operations of a decoder block usable in the receiver of FIG. 6.

FIG. 9 schematically illustrates a representative decoder block 44 for computing an estimated value for each symbol modulated on the X-polarization at the transmitter. In the embodiment of FIG. 9, the decoder block 44 is configured as a sliding window Maximum Likelihood Sequence Estimator (MLSE) 86 with a window-length corresponding to N baud (N+1 symbols). In some embodiments, N>Ncr. In the illustrated embodiment, a respective shift register 88 is provided for receiving the phase rotated sample stream 42 from the carrier recovery block 40. As the sample stream 42 is latched through the shift registers 88, the MLSE block 86 may implement forward and reverse Viterbi algorithms in a manner directly analogous to those described above with reference to FIGS. 7 and 8, in order to compute a maximum likelihood estimate of the symbol X(n) corresponding to the sample(s) at the center of the window.

The embodiments described above are intended to be illustrative only. The scope of the invention is therefore intended to be limited solely by the scope of the appended claims.

We claim:

1. A receiver for use in an optical communications system, the receiver comprising:
   an optical stage configured to detect phase and amplitude of a modulated channel light received through the optical communications system to generate a corresponding multi-bit digital sample stream, wherein the modulated channel light comprises a stream of symbols defined by a constrained phase modulation scheme having a constellation of at least two symbols and in which a modulation phase is constrained to a phase range spanning less than $4\pi$; and
   a digital signal processor configured to process the multi-bit digital sample stream to recover an estimate of each successive symbol of the modulated channel light, the digital signal processor comprising:
      a dispersion compensator configured to process the multi-bit digital sample streams to compensate dispersion impairments of the received modulated channel light;
      a 2×2 Multiple Input Multiple Output (MIMO) channel equalizer configured to process dispersion compensated sample streams output from the dispersion compensator to compensate polarization impairments of the received modulated channel light; and
      a feedback loop configured to steer the 2×2 MIMO channel equalizer using estimated values of received data symbols as a target,
   wherein the feedback loop comprises:
      a programmable target filter configured to filter the estimated values of received data symbols to generate a target signal;
      a comparator configured to generate an error signal based on the target signal and an output of the 2×2 MIMO channel equalizer; and
      a coefficient calculator configured to calculate a set of equalization coefficients for the 2×2 MIMO channel equalizer based on the error signal.

2. The receiver as claimed in claim 1, wherein the optical stage comprises:
   an optical fiber connection configured to receive the modulated channel light through the optical communications system;
   a polarization splitter configured to separate the received modulated channel light into a pair of received polarizations; and
   a respective coherent receiver block configured to detect each received polarization and to generate a respective multi-bit digital sample stream corresponding to each received polarization.

3. The receiver as claimed in claim 1, wherein the programmable target filter comprises:
   a look-up table configured to reconstruct the multi-bit digital sample streams input to the 2×2 MIMO channel equalizer based on the estimated values of received data symbols; and
   a filter configured to filter the reconstructed sample streams using a filter function characterised by increased gain for high frequency content.

4. A receiver for use in an optical communications system, the receiver comprising:
   an optical stage configured to detect phase and amplitude of a modulated channel light received through the optical communications system to generate a corresponding multi-hit digital sample stream, wherein the modulated channel light comprises a stream of symbols defined by a constrained phase modulation scheme having a constellation of at least two symbols and in which a modulation phase is constrained to a phase range spanning less than $4\pi$; and
   a digital signal processor configured to process the multi-bit digital sample stream to recover an estimate of each successive symbol of the modulated channel light, the digital signal processor comprising:
      a dispersion compensator configured to process the multi-bit digital sample streams to compensate dispersion impairments of the received modulated channel light;
      a 2×2 Multiple Input Multiple Output (MIMO) channel equalizer configured to process dispersion compensated sample streams output from the dispersion compensator to compensate polarization impairments of the received modulated channel light;
      a feedback loop configured to steer the 2×2 MIMO channel equalizer using estimated values of received data symbols as a target; and
      a carrier recovery block configured to process polarization compensated sample steams from the 2×2 MIMO channel equalizer to compensate phase error, the carrier recovery block comprising:

an Ncr baud sliding window Maximum Likelihood Sequence Estimation (MLSE) phase detector configured to detect a phase a phase error estimate $\delta\phi_X$ of received symbols;

an anti-causal filter configured to filter the phase error estimate $\delta\phi_X$ to generate a maximum likelihood phase error $\Delta\phi_X$; and a phase rotator configured to rotate the multi-bit digital sample streams based on the maximum likelihood phase error $\Delta\phi_X$.

5. The receiver as claimed in claim 4, wherein the Ncr baud MLSE phase detector is configured to:

identify a most likely sequence of symbols within a window spanning Ncr bauds; and analyse the most likely sequence of symbols to determine a phase of a symbol lying at a center of the window as the phase error estimate $\delta\phi_X$.

6. The receiver as claimed in claim 5, wherein the MLSE phase detector calculates a plurality of possible sequences, and a respective Euclidian distance for each possible sequence, and wherein the most likely sequence is selected as the sequence having the lowest Euclidian distance.

7. The receiver as claimed in claim 4, wherein the Ncr baud MLSE phase detector is configured to:

identify a most likely sequence of symbols and a second most likely sequence of symbols within a window spanning Ncr bauds; and analyse the most likely sequence of symbols to determine a first phase $\phi 1$ of a symbol lying at a center of the window;

analyse the second most likely sequence of symbols to determine a second phase $\phi 2$ of a symbol lying at a center of the window; and compute the phase error estimate $\delta\phi_X$ as a weighted average of first and second phases.

8. The receiver as claimed in claim 7, wherein the MLSE phase detector calculates a plurality of possible sequences, and a respective Euclidian distance for each possible sequence, and wherein the most likely sequence is selected as the sequence having the lowest Euclidian distance, and the second most likely sequence is selected as the sequence having the second lowest Euclidian distance.

9. The receiver as claimed in claim 4, wherein the Ncr baud MLSE phase detector is configured to operate entirely in the phase domain.

10. The receiver as claimed in claim 4, wherein the digital signal processor further includes an N baud sliding window Maximum Likelihood Sequence Estimation (MLSE) decoder for calculating an estimated value of each symbol modulated on the received modulated channel light.

11. In a receiver of an optical communications system a method of recovering data transmitted through the optical communications system, the method comprising:

an optical stage detecting a modulated channel light received through the optical communications system and generating a corresponding multi-bit digital sample stream, the modulated channel light comprising a stream of symbols defined by a constrained phase modulation scheme having an asymmetrical constellation of at least two symbols and in which a modulation phase is constrained to a phase range spanning less than $4\pi$; and a digital signal processor digitally processing the multi-bit digital signal to recover an estimate of each successive symbol of the modulated channel light, wherein digitally processing the multi-bit digital signal comprises:

a 2×2 Multiple Input Output (MIMO) channel equalizer processing the multi-bit digital sample streams to compensate polarization impairments of the received modulated channel light; and a feedback loop steering the 2×2 MIMO channel equalizer using estimated values of received data symbols and a known symbol sequence as a target, wherein steering the 2×2 MIMO channel equalizer comprises:

filtering the estimated values of received data symbols to generate a target signal;

generating an error signal based on the target signal and an output of the 2×2 MIMO channel equalizer; and calculating a set of equalization coefficients for the 2×2 MIMO channel equalizer based on the error signal and the multi-bit digital signal at an input of the 2×2 MIMO channel equalizer.

12. The method as claimed in claim 11, wherein digitally processing the multi-bit digital signal comprises removing a non-zero mean of the multi-bit digital signal at an input of the 2×2 MIMO channel equalizer.

13. The method as claimed in claim 11, wherein filtering the estimated values of received data symbols comprises:

reconstructing the multi-bit digital sample streams input to the 2×2 MIMO channel equalizer based on the estimated values of received data symbols; and filtering the reconstructed sample streams using a filter function characterised by increased gain for high frequency content.

14. The method as claimed in claim 11, further comprising a step of removing a non-zero mean of the error signal.

15. The method as claimed in claim 11, further comprising a carrier recovery block processing the multi-bit digital sample streams to compensate phase error, the carrier recovery block is configured to:

detect a phase error estimate $\delta\phi_X$ of received symbols using an Ncr baud sliding window Maximum Likelihood Sequence Estimation (MLSE) phase detector within a window;

filter the phase error estimate $\delta\phi_X$ using an anti-causal filter to generate a maximum likelihood phase error $\Delta\phi_X$; and rotate the multi-bit digital sample streams based on the maximum likelihood phase error $\Delta\phi_X$.

16. The method as claimed in claim 15, wherein detecting the phase error estimate $\delta\phi_X$ comprises:

identifying a most likely sequence of symbols within a window spanning Ncr bauds; and analysing the most likely sequence of symbols to determine a phase of a symbol lying at a center of the window as the phase error estimate $\delta\phi_X$.

17. The method as claimed in claim 16, wherein identifying a most likely sequence of symbols comprises:

calculating a plurality of possible sequences, each possible sequence having a length of Ncr-baud and a respective Euclidean distance; and selecting the most likely sequence as the possible sequence having the lowest Euclidean distance.

18. The method as claimed in claim 17, wherein calculating the plurality of possible sequences comprises:

calculating a set of forward sequences using a forward Viterbi algorithm, and a set of backward sequences using a backwards Viterbi algorithm, wherein the forward sequences the backward sequences stat at opposite ends of the Ncr-baud window and have an overlap of at least one baud in a central portion of the window; and analysing overlapping portions of each of the forward and backward sequences to identify a lowest Euclidean distance connection between each forward sequence, and each backward sequence; and merging each forward sequence with a respective one of the backward sequences based on the identified lowest Euclidean distance connection.

19. The method as claimed in claim 15, wherein detecting the phase error estimate $\delta\phi_X$ further comprises:
   identifying second most likely sequence of symbols within a window spanning Ncr bauds; and
   analysing the most likely sequence of symbols to determine a first phase $\phi1$ of a symbol lying at a center of the window;
   analysing the second most likely sequence of symbols to determine a second phase $\phi2$ of a symbol lying at a center of the window; and
   computing the phase error estimate $\delta\phi_X$ as a weighted average of first and second phases.

20. The method as claimed in claim 19, wherein the second most likely sequence is selected as the sequence having the second lowest Euclidian distance.

21. The method as claimed in claim 15, wherein the Ncr baud MLSE phase detector is configured to operate entirely in the phase domain.

22. The method as claimed in claim 11, wherein digitally processing the multi-bit digital signal comprises an N baud sliding window Maximum Likelihood Sequence Estimation (MLSE) decoder calculating an estimated value of each symbol modulated on the received modulated channel light.

23. The method as claimed in claim 22, wherein calculating an estimated value of each symbol comprises, for each successive symbol:
   identifying a most likely sequence of symbols within a window spanning N bauds; and
   analysing the most likely sequence of symbols to determine a value of a symbol lying at a center of the window as the estimate value of the symbol.

24. The method as claimed in claim 23, wherein identifying a most likely sequence of symbols comprises:
   calculating a plurality of possible sequences, each possible sequence having a length of N-baud and a respective Euclidean distance; and
   selecting the most likely sequence as the possible sequence having the lowest Euclidean distance.

25. The method as claimed in claim 24, wherein calculating the plurality of possible sequences comprises:
   calculating a set of forward sequences using a forward Viterbi algorithm, and a set of backward sequences using a backwards Viterbi algorithm, wherein the forward sequences the backward sequences stat at opposite ends of the N-baud window and have an overlap of at least one baud in a central portion of the window; and
   analysing overlapping portions of each of the forward and backward sequences to identify a lowest Euclidean distance connection between each forward sequence, and each backward sequence; and
   merging each forward sequence with a respective one of the backward sequences based on the identified lowest Euclidean distance connection.

* * * * *